(12) United States Patent
Tokoro et al.

(10) Patent No.: US 6,234,523 B1
(45) Date of Patent: May 22, 2001

(54) DUAL TYPE INFLATOR DEVICE WHEREIN LIGHT-EMITTING PHENOMENON IS SUPPRESSED

(75) Inventors: Takuji Tokoro, Funabashi; Nobuyuki Katsuda, Himeji, both of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/459,915

(22) Filed: Dec. 14, 1999

(30) Foreign Application Priority Data

Dec. 14, 1998 (JP) .................................................. 10-354317

(51) Int. Cl.⁷ .................................................. B60R 21/26
(52) U.S. Cl. .................................................. 280/737; 280/740
(58) Field of Search .................................................. 280/737, 736, 280/740, 741, 742; 102/530, 531

(56) References Cited

U.S. PATENT DOCUMENTS

| | | |
|---|---|---|
| 3,868,124 | 2/1975 | Johnson . |
| 3,972,545 | 8/1976 | Kirchoff et al. . |
| 5,219,178 | 6/1993 | Kobari et al. . |
| 5,351,988 | 10/1994 | Bishop et al. . |
| 5,564,743 * | 10/1996 | Merchant .............................. 280/741 |
| 5,582,806 * | 12/1996 | Skanberg et al. ................. 280/737 X |
| 5,630,619 * | 5/1997 | Buchanan et al. .................... 280/741 |
| 5,709,406 * | 1/1998 | Buchanan .............................. 280/737 |
| 5,711,546 * | 1/1998 | Hamilton et al. ..................... 280/736 |
| 5,788,275 | 8/1998 | Butt et al. . |
| 5,799,973 * | 9/1998 | Bauer et al. .......................... 280/741 |

FOREIGN PATENT DOCUMENTS

| | | |
|---|---|---|
| 10100851 | 4/1998 | (JP) . |
| 11286254 | 10/1999 | (JP) . |

* cited by examiner

Primary Examiner—Brian L. Johnson
Assistant Examiner—Bryan Fischmann

(57) ABSTRACT

To improve light emitting phenomenon occurring in an air bag when respective inflators are different in activation start time from each other, namely, when the activation of one of the inflators is delayed from that of the other in a dual type inflator device. A dual type inflator device comprises a hybrid-type inflator and a pyro-type inflator, wherein an end portion of the pyro-type inflator having a gas outlet is connected to an end portion of a diffuser assembly of the hybrid-type inflator, the gas outlet of the pyro-type inflator is formed in a tube shape so as to have a gas passage, the gas outlet extending into an outlet passage through a central portion of the diffuser assembly of the hybrid-type inflator, and gas flow from the pyro-type inflator is mixed with gas flow of the hybrid-type inflator in the outlet passage.

13 Claims, 3 Drawing Sheets

DUAL TYPE INFLATOR DEVICE WHEREIN LIGHT-EMITTING PHENOMENON IS SUPPRESSED

BACKGROUND OF THE INVENTION

1. Field of the Invention

The present invention relates to an inflator for a safety system of an automotive vehicle, and particularly, to an improvement in a dual type inflator device where a hybrid-type inflator and a pyro-type inflator are combined.

2. Background of the Prior Art

Inflators of various designs and configurations have been invented for an air bag module equipped in a vehicle. When an inflator is activated, gas component is generated for inflating an air bag. Inflators can generally be classified into different groups or types. A hybrid-type inflator includes pressurized gas stored, which acts with a gas generated by inflammable propellant to generate gas component for filling the air bag. On the other hand, in a pyro-type inflator, the entire gas that fills an air bag a propellant gas generated a solid gas generating propellant composition.

Among conventional inflator systems, a system where at least two inflators are assembled has been known. That is, inflator systems of a plurality of inflators including a dual type have been developed in various manner.

For deployment system in a dual type inflator device, various structures have been proposed in consideration of factors such as ages and/or sizes of vehicle occupants and/or positions of the vehicle occupants in a vehicle. In a known system, a plurality of gas generating units for inflating an air bag can selectively be activated. Such at least two units are activated when a relatively increased pressure should be provided in the air bag.

In systems of another prior art, such as U.S. Pat. Nos. 3,868,124, 3,972,545, 5,219,178, 5,351,988, and U.S. Pat. No. 5,564,743, a dual type inflator device has been proposed where a hybrid-type inflator is connected at its gas outlet with a pyro-type inflator having a size smaller than the hybrid-type inflator.

However, in the conventionally proposed dual type inflator device, when respective inflators have different activation timings, that is, when activation of one of the inflators is delayed from that of the other, light-emitting phenomenon, appearing like a lantern, sometimes occurs in the air bag, which is required to be eliminated.

BRIEF SUMMARY OF THE PRESENT INVENTION

According to the present invention, there is provided a dual type inflator device for inflating an air bag in a vehicle where light-emitting phenomenon is suppressed at an activation. The device of the present invention is a dual type inflator device comprising a first inflator and a second inflator. In a preferred embodiment, the first inflator is a hybrid-type inflator including first gas generating material and pressurized medium. It is preferable that such gas generating material includes fuel-rich component and is intended to warm and inflate the pressurized medium, and the pressurized medium includes a large amount of oxygen in a range of about 2 to 30% after actuating the first inflator. The pressurized medium of the first inflator preferably includes a sufficient amount of oxygen even if the first gas generating material and second gas generating material described below are combusted. The term "fuel-rich" means that the component includes oxygen in its molecular structure even in an amount smaller than chemical equivalent amount of oxygen which will be required to convert the whole hydrogen which can exist in the component to water and convert the whole carbon which can exist in the component to carbon dioxide even while the component is put in a self-support combustion reaction. When the fuel-rich component is combusted alone, gaseous product including a large amount of carbon monoxide and/or hydrogen will be generated. The carbon monoxide and hydrogen are not desirable for deploying an inflatable air bag in vehicle safety system. Particularly, gun-type propellants are preferable to be used as the fuel-rich component or fuel-rich material, the gun-type propellants are easily available and inexpensive, and their combustion characteristics are well understood. The gun-type propellant used here is a single-, double- or triple-base propellant, includes high-temperature fuel-rich component with a high combustion temperature such as nitramin propellant, for example, LOVA (low vulnerability ammunition) and HELOVA (high energy and low vulnerability ammunition). The first and second gas generating materials having the same composition, shape and the like can be used, but different kinds of propellants can also be used as the respective gas generating materials.

More specifically, the gun-type propellant is fuel-rich and has a combustion temperature of a range from about 2,500° K. to about 3,800° K. An example of a suitable gun-type propellant includes nitramine-base propellant having RDX (cyclotrimethylenetrinitramine) or HMX (cyclotetramethylene-tetranittramine) as main component. PETN (pentaerythitrol tetraanitrate) and TAGN (triaminoguanidinium nitrate) are useful as the main component in the gun-type propellant. Other suitable propellants involve ones containing tetrazole-base compound and triazole-base compound. The most preferable fuel-rich component is RDX among the gun-type propellants.

The second inflator preferably includes pyro-type inflator having fuel-rich second pyro-type gas generating material. The pyro-type inflator does not include any pressurized medium reacting with the gas components generated by the second gas generating material when the air bag is filled with the gas components. The second inflator serves mainly to warm and expand the pressurized material in the first inflator by the heat generated when the second gas generating material is combusted. According to the present invention, in the first and second inflators constituting the dual type inflator device, a diffuser assembly portion of a hybrid-type inflator constituting the first inflator is connected with an gas outlet of a pyro-type inflator constituting the second inflator, and the structure of the connecting portion is improved so that the light-emitting phenomenon that tends to occur at an activation when the second inflator is activated at a predetermined interval (for example, 20 milliseconds to 40 milliseconds or so) after the first inflator is prevented.

Namely, the present invention relates to a dual type inflator device for inflating an air bag in a vehicle, comprising a first inflator and a second inflator; the first inflator comprising a hybrid-type inflator having hybrid-type gas generating material and an activating assembly used for activating the hybrid-type gas generating material; the second inflator comprising a pyro-type inflator having pyro-type gas generating material and an activating assembly used for activating the pyro-type gas generating material; the first inflator having an inflator housing with one end at which a diffuser assembly is disposed, the inflator housing having an outlet passage communicating with the diffuser assembly, a gas flow from the inflator housing being discharged into an air bag from an outlet hole of the diffuser assembly through the outlet passage; and an end portion of the second inflator having a gas outlet being connected to an end portion of the diffuser assembly of the first inflator, the gas outlet of the second inflator being formed in a tube configuration having a gas passage to extend into the outlet passage of the first inflator through a central portion of the diffuser assembly of the first inflator, a gas flow from the second inflator being mixed with the gas flow of the first inflator in the outlet passage. The pyro-type gas generating material contained in the second inflator serves such that the combustion component produced by combustion of the material flows into the first inflator to warm and inflate the pressurized medium in the first inflator mainly.

It is preferable that a plurality of layers of metallic net are disposed inside of the diffuser assembly of the first inflator, and after the gas flow passing through the outlet passage passes through the plurality of layers of metallic net, it is exhausted from the outlet hole. Also, it is preferable that the gas outlet of the second inflator is blocked by a rupturable member, and the rupturable member is ruptured only by activation of the second inflator while it is not ruptured by activation of the first inflator. The gas outlet where the rupturable member is provided is an opening portion for controlling an internal pressure in the second inflator when the pyro-type gas generating material is combusted.

A preferable embodiment of the hybrid-type inflator constituting the first inflator has a structure comprises an inflator housing, pressurized medium accommodated in at least the inflator housing, a gas generator, the gas generator including a gas generator housing communicated with the inflator housing and propellant disposed in the gas generator housing, an outlet passage allowing an inner space of one of the inflator housing and the gas generator housing to communicate with the diffuser assembly, a first closing disk for sealing the outlet passage, a projectile aligned with the first closing disk and, combustion product producing means for producing combustion product for igniting the propellant, wherein the projectile is propelled to penetrate the first closing disk at least partially by using the combustion product producing means, and the outlet passage is disposed in the inflator housing to extend so as to pass through one end of the inflator housing and is at least partially aligned with the gas generator housing. The gas generator warms and inflates the pressurized medium by the combustion product generated through activation of the gas generator.

It is preferable that each of the first and second inflators outputs combustion product including gas component when it is activated, and the combustion product from the second inflator is further combusted in the outlet passage of the first inflator by using the combustion product of the first inflator.

The oxygen gas of the first inflator occupies at least 2% concentration of the gas of the first inflator after activated, and an amount of the oxygen gas is set such that the oxygen gas remains even when it reacts with the combustion product of the second inflator after activation of the first inflator. It is preferable that the concentration of the oxygen gas in the first inflator is in a range of about 2 to 30% of the gas generated at the first inflator after the first inflator is actuated.

The structures, parts, means, methods and futures of the invention may be combined with one another to practice the air bag system and the inflator of the invention.

According to the present invention, in a dual type inflator device in which at least two inflators are assembled, the dual type inflator device is provided where light-emitting phenomenon generated in the air bag is suppressed even in a case where activation start times of respective inflators are different from each other, namely, one of the inflators is delayed from the other to be activated.

DETAILED DESCRIPTION OF PREFERRED EMBODIMENTS

Now, a description will be given in more detail of various peferred embodiments of the present invention with reference to the accompanying drawings.

Figure 1:
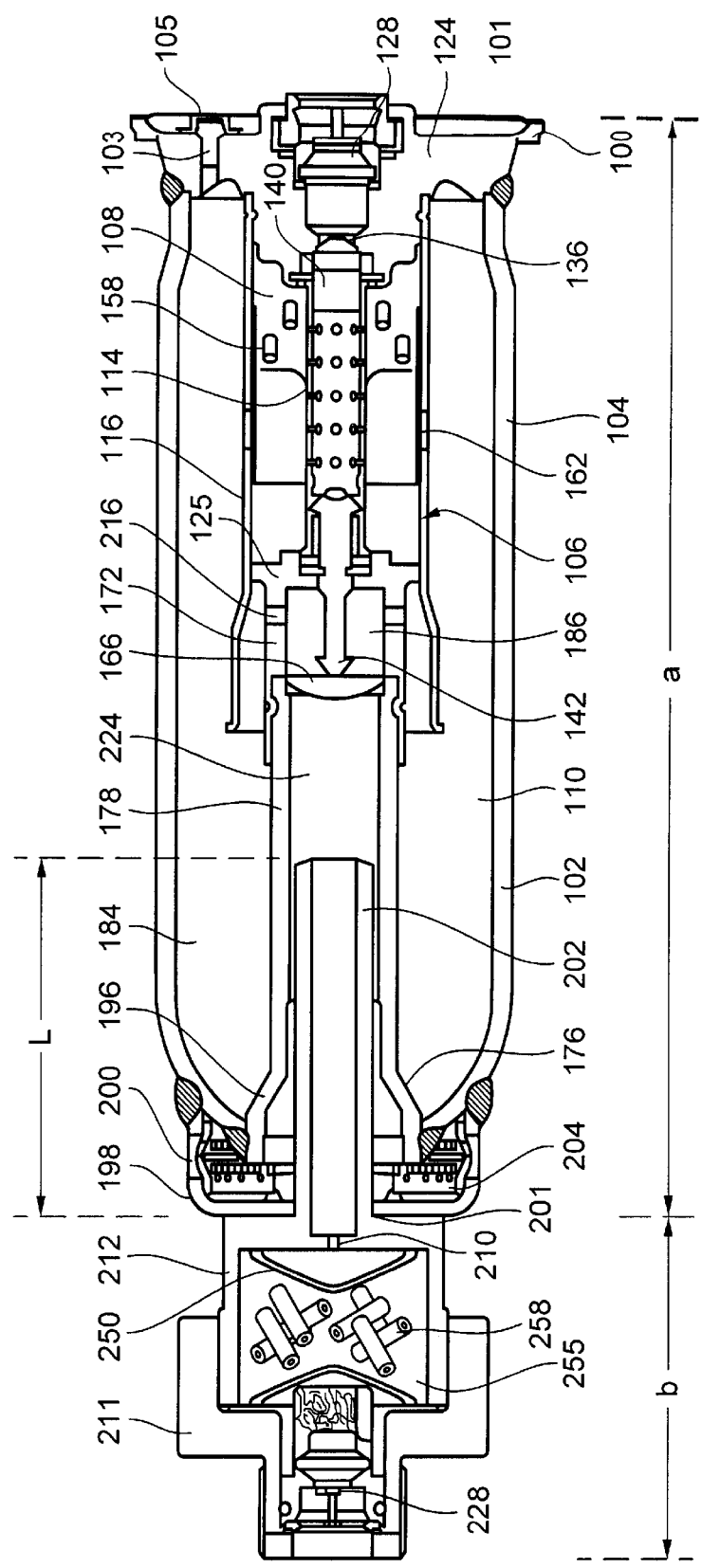
FIG. 1 is a vertical cross-sectional view of a dual type gas generator in accordance with an embodiment of the present invention.

FIG. 1 is a vertical cross-sectional view showing an embodiment of a dual type inflator device of the present invention. In FIG. 1, the dual type inflator device for a passenger side is illustrated as one aspect of the present invention. The dual type inflator includes a hybrid-type inflator portion 'a' and a pyro-type cartridge portion 'b'. Though the hybrid-type inflator portion 'a' may include one of a plurality of different designs and configurations, for example, a hybrid inflator portion disclosed in Japanese laid-open patent application No. 10-100851 is preferably used as the hybrid-type inflator portion. The hybrid inflator portion includes a pressurized medium serving as hybrid gas generating material and a cylindrical gas generator 106 generating gases for inflating the pressurized medium. The gas generator includes gas generating material or propellant 158. The propellant 158 is for mainly warming the pressurized medium by heat generated at a combustion, and it is preferably of a gun-type and is fuel-rich. The pressurized medium includes oxygen and inert gas such as argon, and even after the pressurized medium warmed by combustion of the propellant 158, a relative oxygen-rich combustion product is generated from the hybrid inflator 102. As shown in FIG. 1, the hybrid inflator 102 includes a diffuser portion 198 at its output end. The diffuser portion or assembly 198 has one or more outlets 200 communicating with an inflatable air bag (not shown). A screen or another fine particle filter 204 is disposed in the diffuser assembly 198, so that fine particles having sizes larger than a predetermined size can be prevented from being discharged. An opening 201 is formed in the diffuser portion 198, and the diffuser portion 198 receives a tube 202 mounted to a pyro-type cartridge 211 through the opening 201. The tube 202 communicates with a propellant housing 212 of the pyro-type cartridge 211 through a passage 210, which allows the combustion product including gas component to pass through an outlet passage 224 of the hybrid inflator portion 102 from a combustion chamber 255 of the propellant housing via the passage 210 through the tube 202. Namely, the housing 212 of the pyro-type cartridge 211 is structured such that it is mounted to the diffuser portion 198 of the hybrid-type inflator and the connecting tube 202 extends in the outlet passage 224. In this embodiment, the connecting tube 202 is formed so as to have length L of about 30 mm and extends into the outlet passage 224. Also, the passage 210 controls combustion performance of the gas generating material. That is, the combustion surface area of the gas generating material 258 and the passage 210 are correlated with each other, so that they are adjusted to optimize the combustion internal pressure of the gas generating material and obtain desirable performances. The inner diameter of the passage 210 can be changed in a range from 1.5 to 3.0 mm. In this embodiment, the inner diameter is adjusted to be 2.6 mm.

The pyro-type cartridge 211 has an initiator assembly 228 serving as an activating assembly, and the initiator assembly 228 is for igniting or activating gas generating material or propellant 258 accommodated in the housing 212 of the pyro-type cartridge 211. The propellant 258 is preferably of a fuel-rich gun-type propellant, and it has the same composition and shape as those of the propellant 158 of the gas generator 106. It is to be noted that compositions and shapes different from those of the propellant 158 of the gas generator 106 are also usable as the propellant 258.

A screen-like filter member 250 is disposed between the gas generating material 258 and the passage 210. The filter member is formed of metallic net made of, for example, stainless steel, and prevents the passage from being blocked by fine particles produced when the gas generating material is combusted and protects the gas generating material 258 in the housing 212 from vibrations. As shown in the figure, the filter member 250 is formed in a cone shape having a convex central portion to secure a space in the vicinity of the passage, so that the passage is prevented from being narrowed by the meshes of the net. Although the total amount of the gas generating material filled in the housing 212 is of about 4.0 gram in this embodiment, the total amount may be changed according to the kind and/or shape of the gas generating material. When the amount is a small, a similar filter member is disposed at the other end in the housing 212 for filling the space, as shown in FIG. 1. The filter member used in the embodiment is a plain weave metallic net having wire of ø 0.55 mm and mesh #16, but the filter member used in this invention is not limited specifically to the filter member of the embodiment, if it meets the purpose.

In this embodiment, when both the inflators 102 and 211 are activated, the combustion product including fuel-rich gas component generated by combustion of the fuel-rich gas generating material 258 within the pyro-type inflator 211 passes into the diffuser assembly 198 of the hybrid-type inflator 102 from the pyro-type inflator 211. In the diffuser assembly 198, such fuel-rich combustion product reacts with, or is coupled with, relatively oxygen-rich combustion product containing gas component supplied from the hybrid-type inflator 102. The mixture or coupling of the combustion products from the two inflators 102 and 211 occurs in the outlet passage 224 and the diffuser assembly 198. Owing to the reaction, relatively high poisonous substances such as cabon monoxide or hydrogen contained in the fuel-rich combustion product from the pyro-type cartridge are changed to nonpoisonous carbon dioxide or water by the oxygen-rich combustion product of the hybrid-type inflator side. However, in a case that the tube 202 is short, this reaction occurs relatively near the gas outlet of the diffuser assembly 198, so that light-emitting phenomenon is observed in the vicinity of the gas outlet 200 when the dual gas generator is activated. Also, when the oxygen concentration of the pressurized medium existing in the hybrid-type inflator portion 102 is low, undesirable gas component such as carbon monoxide exists in an amount more than an acceptable amount in the combustion product after the two inflators 102 and 211 are activated.

The mixed combustion products pass through the gas outlet 200 of the diffuser assembly 198 of the hybrid-type portion as the gas component for inflating the air bag to be introduced into the air bag (not shown).

Next, the structure of the hybrid portion in FIG. 1 will be described below.

In the inflatable type safety system in FIG. 1, the hybrid-type inflator 102 includes a cylindrical inflator comprising a storage gas housing 104. The storage gas housing 104 includes a suitable pressurized medium 184 (for example, pressurized fluid containing one or more liquids and/or one or more gases, which includes inert gases and oxygen), a cylindrical gas generator 106 containing a suitable gas/heat generating agent for increasing a gas flow into the air bag, the gas/heat generating agent being the propellant 158 (for example, at least 85% of the heat used for increasing the inflating capacity of the system is obtained by combustion of the propellant 158), an initiator 128 serving as an activating assembly for achieving discharge of the pressurized medium 184 (achieved by forming a a flow passage between the inflator 102 and the air bag) and anition of the propellant 158, and the diffuser assembly 198 for guiding the gas flow from the inflator 102 to the air bag. The inflator 102 preferably includes a gas generating material composition comprising gun-type propellant and/or hybrid-type propellant, and the pressurized medium 184 containing a plurality of components (for example, one of the components is oxygen and the other component is at least one inert fluid. The inflator 102 includes an outlet passage disposed "upward" of the diffuser assembly 198 of the inflator 102, that is, an after-burner tube 178.

A portion of the inflator 102 is formed in a pressure container for putting the pressurized medium 184 in a static state, namely, a state before the initiator 128 is activated. The initiator 128 is fitted into an adapter 124, and the adapter 124 is formed from a boss 101 having a flange 100. A reference numeral 105 denotes a sealing pin inserted into a pressurized gas filling hole 103. The other end of the storage gas housing 104 is closed by the after-burner tube 178 and the diffuser assembly 198.

In a static state, the pressurized medium 184 is accommodated in multiple chambers in the inflator 102. The chambers communicates with one another for forming gas flow passages allowing the gas flow from the inflator 102 to flow out. The gas generator 106 has a gas generator housing 116. The gas generator housing 116 is disposed in the storage gas housing 104 concentrically therewith and defines a first chamber 108. The propellant 158 is accommodated in the first chamber 108 of the gas generator housing 116. A second chamber 110 communicates with the first chamber 108 of the gas generator housing 116. The second chamber 110 accommodates the pressurized medium 184 in a static state, namely, the state prior to activation of the initiator 128. The second chamber 110 is structured in a separated manner by an annular space defined between the storage gas housing 104 and the gas generator 106 and another annular space defined between the storage gas housing 104 and the after-burner tube 178. The first chamber 108 and the second chamber 110 always communicate with each other. As a result, in the static state (before the initiation of the initiator 128), the first chamber 108 in the gas generator housing 116 also contains the pressurized medium 184.

A communication between the second chamber 110 and a third chamber 186 is formed by at least one, preferably a plurality of orifice sleeve ports 216. The orifice sleeve ports 216 are formed on an orifice sleeve 172 so as to be spaced from one another in radial directions and be opened. In this embodiment, four ports each having an inner diameter of about 3.25 mm are formed at equal intervals. The entire gas from the hybrid-type inflator passes through the ports 216, and in FIG. 1 the ports 216 control the gas flow. Accordingly, it is necessary that any portion preventing the gas flow does not exist upward and downward of the ports 216. The orifice sleeve 172 connects the after-burner tube 178 and the gas generator 106 with each other. One end of the orifice sleeve 172 is suitably fixed to an end portion wall of the gas generator 106. Further, the end portion wall of the gas generator 106 closes one end of the first chamber 108 of the gas generator housing 116. The other end of the orifice sleeve 172 is crimped to be connected to the end of the after-burner tube 178. In the static state, namely, before activation of the initiator 128, the third chamber 186 is sealed in order to retain the pressurized medium 184 in the first chamber 108, the second chamber 110 and the third chamber 186, respectively. Owing to this sealing a first disk 166 is disposed and retained between the end of the after-burner tube 178 and the orifice sleeve 172. The first closing disk 166 configures a main separation portion between the inflator 102 and the air bag and is characterized as an output disk.

The first closing disk 166 can be disposed at an intermediate position within the inflator 102. In this embodiment, the first closing disk 166 is disposed within and generally at a central portion of the storage gas housing 104.

The after-burner tube 178 is communicated with the third chamber 186 after the first closing disk 166 is ruptured or opened as described below. Then, the after-burner tube 178 is connected to the diffuser assembly 198 having a plurality of gas outlets 200 and a fine particle filter 204. The gas flow discharged from the diffuser assembly 198 flows into the air bag to inflate the same. The after-burner tube 178 and the diffuser assembly 198 form an outlet passage in the inflator 102. One end of the after-burner tube 178 connected to the diffuser assembly 198 has a divergent end region 176. The end region 176 has a diameter larger than that of the other end of the after-burner tube 178 retaining the first disk 166 and reduces the rate of the gas flow discharged form the inflator 102.

The first chamber 108 is defined in the gas generator by a hollow flame-transfer tube 114. The flame-transfer tube 114 is disposed in the gas generator housing 116 concentrically therewith. The propellant 158 is disposed in the first chamber 108 radially outside the flame-transfer tube 114. The cylindrical flame-transfer tube 114 is aligned with the initiator 128 for leading the activation output of the initiator 128.

At least one, preferably a plurality of gas generator outlet ports 162 are formed in the gas generator housing 116 in order to always put the storage gas housing 104 and the gas generator housing 116, more specifically, the first chamber 108 of the gas generator housing 116 where the propellant 158 is disposed, in communication with each other.

In order to increase the gas flow amount into the air bag, the entire combustion sub-product of the propellant 158 and the entire sub-product flowing out of the initiator 128 preferably flow from the gas generator housing 116 through the gas generator outlet ports 162.

The propellant 158 is ignited in the gas generator housing by the initiator 128. In order to separate the initiator 128 from the pressurized medium within the inflator 102 and further achieve a sealing for the inflator 102, a second closing disk 136 is disposed between the gas generator 106 and the initiator 128.

The output of the initiator (or ignition/buster agent 140) is transmitted to the propellant so as to ignite the propellant 158 by activation of the initiator 128. In order to achieve this purpose, at least one, preferably a plurality of flame-transfer tube ports are formed on the flame-transfer tube 114. The plurality of flame-transfer tube ports may be disposed radially around the flame-transfer tube 114 and can be provided so as to be spaced from one another along the longitudinal direction of the flame-transfer tube 114.

The initiator 128 has a suitable ignition/buster agent 140 for increasing an ignition performance to the propellant 158 (for example, RDX/aluminum buster agent produced by mixing 89 weight % of RDX and 11 weight % of aluminum powder is used therefor. 0.5 to 5.0 weight % of the RDX/aluminum powder is replaced with 0.5 to 5.0 weight % of hydroxypropyl-cellulose). This ignition/buster agent 140 can be disposed between the initiator 128 and the propellant 158 in a state where its output is aligned with the output of the initiator 128. The inflammable substances in the initiator 128 are ignited by activating the initiator 128. Then, the ignition/buster agent 140 is ignited by the combustion of the inflammable substances. In order to contact at least one of the combustion product produced by activation of the initiator and the combustion product produced by combustion of the ignition/buster agent directly to the propellant and ignite the propellant, the products is led to the propellant via the flame-transfer tube and the flame-transfer tube ports. The ignition/buster agent is in the form of a powder. For this aim, the ignition/buster agent is accommodated in a thin wall cup. The cup is disposed inside one end of the flame-transfer tube. Furthermore, the cup has an open end directed to the initiator 128 and a closed end positioned at an opposite side of the open end. Accordingly, the combustion products for igniting the propellant are moved in the flame-transfer tube.

In addition that the propellant is ignited by activation of the initiator 128, a projectile/valve 142 is pushed out to the opposite side of the initiator by pressure and impact force generated from the initiator and/or the ignition/buster agent, so that the first disk 166, which is the main separation portion positioned between the inflator 102 and the air bag, is ruptured. Thereby, a passage is formed between the inflator 102 and the air bag. The projectile/valve is partially received inside one end of the flame-transfer tube positioned at an opposite side of the ignition/buster agent. Further, the projectile/valve 142 is aligned with the initiator 128 and the ignition/buster agent and also is held at a fixed position by a shearing ring. Also, the projectile/valve 142 extends through an end portion wall 125 of the gas generator housing 116 beyond one end of the flame-transfer tube 114. Further, the projectile/valve 142 is aligned with the first disk 166 in the axial direction, and is spaced from the same. Therefore, the pressurized medium, the propellant gas and the other combustion products are guided to the third chamber 186 from the second chamber 110 through the orifice sleeve ports 216, and then discharged from the inflator 102 via the diffuser assembly 198 to be guided toward the air bag.

Figure 2:
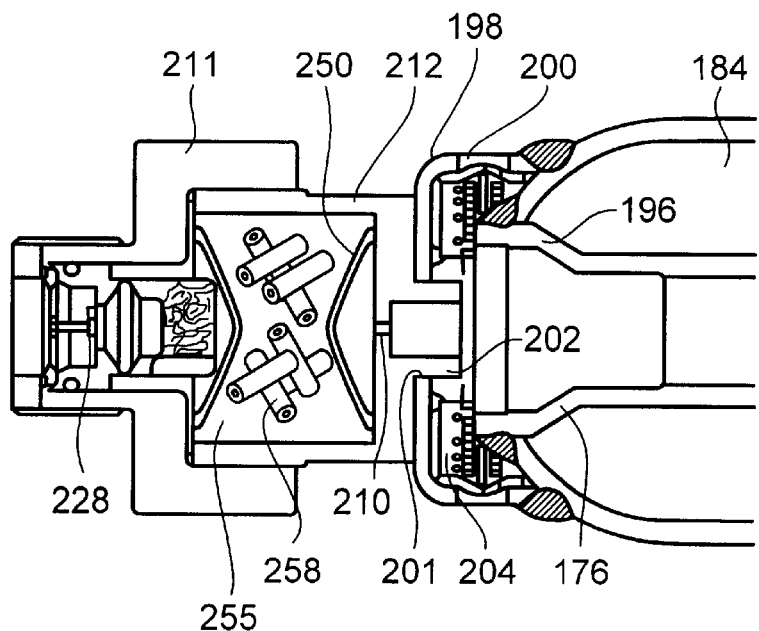
FIG. 2 is a vertical cross-sectional view of a main portion of a conventional dual type gas generator.
Figure 3:
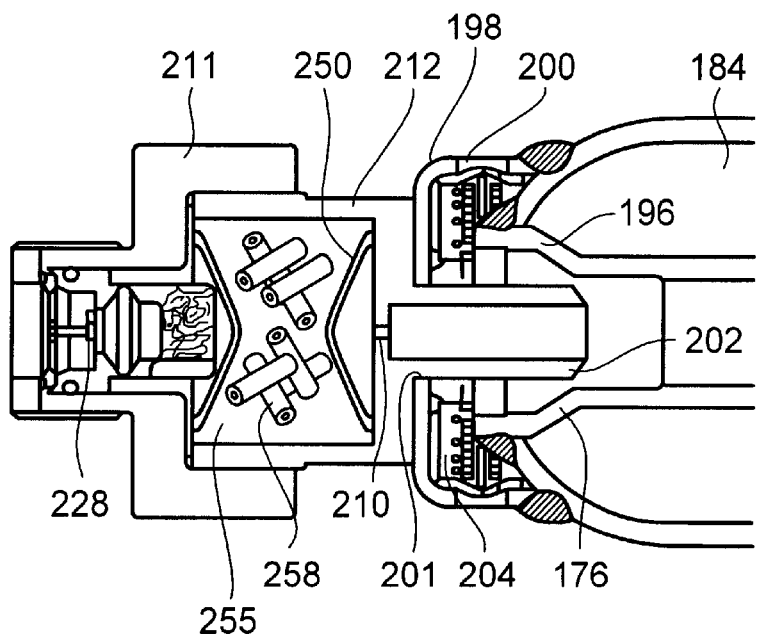
FIG. 3 is a vertical cross-sectional view of a dual type gas generator in accordance with another embodiment of the present invention.

FIG. 2 shows a conventional example where the connecting tube 202 of the pyro-type cartridge is short and is fixedly connected to an opening of the diffuser assembly 198 of the hybrid-type inflator in a similar structure to the FIG. 1 where the pyro-type cartridge (left side) and the hybrid-type inflator are combined. In this case, when the hybrid-type inflator is ignited and then, the pyro-type cartridge is ignited after a predetermined time lapses, light-emitting phenomenon has been observed. It should be noted that, when the pyro-type cartridge and the hybrid-type inflator are ignited simultaneously, light-emitting phenomenon is not observed. As shown in FIG. 2, in a case that the connecting tube 202 of the pyro-type cartridge is short, when the oxygen-rich combustion product from the hybrid-type inflator 102 and the fuel-rich combustion product from the pyro-type cartridge 211 react with each other to produce carbon dioxide or water, this reaction occurs relatively in the vicinity of the gas outlet 200 in the diffuser assembly 198, so that the light-emitting phenomenon is observed near the outlet 200 in the air bag at the activation. As shown in FIG. 3, the present inventors have found that the light-emitting phenomenon can be suppressed by extending the connecting tube 202 of the pyro-type cartridge in the depth of the after-burner tube 178. The longer the length of the tube 202, the higher the light-emitting phenomenon suppression effect. The suppression effect is higher in the case shown in FIG. 1 than in the case shown in FIG. 3. It should be noted that in the embodiment shown in FIG. 1, when the first disk 166 is ruptured to discharge gas, the orifice ports 216, through which the gas in the hybrid-type inflator passes, control the rate of the gas flow. Accordingly, the space formed by the inside of the after-burner tube 178 and the outside of the tube 202 is adjusted such that the sectional area perpendicular to the axial direction is larger than the total opened area of the orifice ports 216.

The present inventors have found that, in the dual type inflator of the present invention, the tube 202 is extended to a large extent into the outlet passage 224 (for example, into the after-burner tube 178) so that the light-emitting phenomenon occurring at the activation time can be suppressed and in addition thereto the light-emitting phenomenon is remarkably suppressed by combination with a structure described below. Thus, in the present invention, it is preferable that the structure where the tube 202 is inserted deeply in the after-burner tube 178 is combined with one or both of methods described below.

Figure 4:
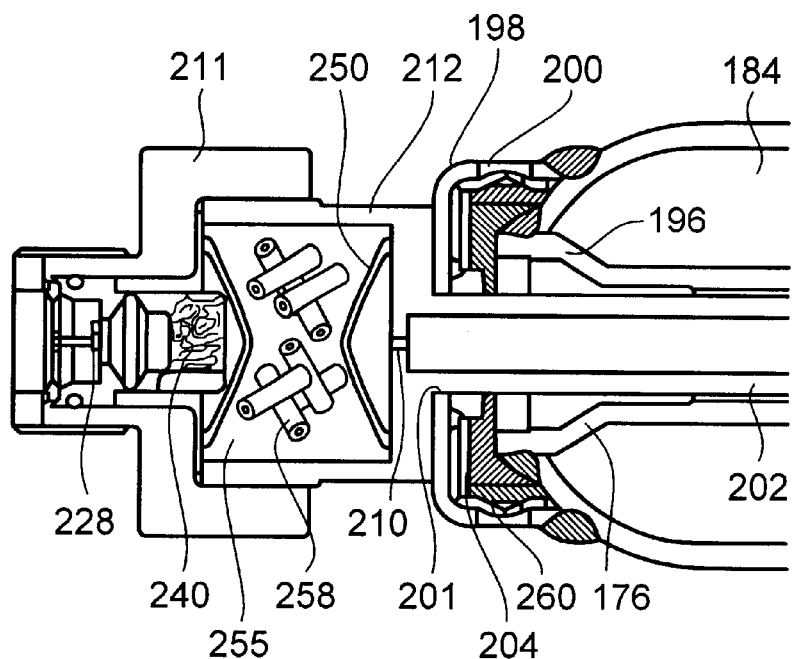
FIG. 4 is a vertical cross-sectional view of a main portion of a dual type gas generator in accordance with still another embodiment of the present invention.

A first method is to dispose a plurality of layers of a metallic net 260 inside the fine particle filter 204 disposed in the diffuser portion of the hybrid-type inflator in the dual type inflator of FIG. 1, as shown in FIG. 4. The metallic net 260 used here is preferably made of stainless steel. For example, the layers may be constituted by four or so stacked plain weave metallic nets each having wire diameter of ø 0.55 mm and mesh #18. Thereby, a cooling effect for combustion products including gas component is improved so that the light-emitting phenomenon is further suppressed. It is considered that, in addition thereto, an action due to a flame arrester effect (effect by which flame passes through a metallic net having a certain mesh size to vanish) is added so that the light-emitting phenomenon is still further suppressed. If the metallic net used achieves this object, any metallic net can be used irrespective of its specification (for example, a plain weave metallic net, a plain dutch weave metallic net, a twilled dutch weave metallic net or the like), a wire diameter, a place to be disposed.

Figure 5:
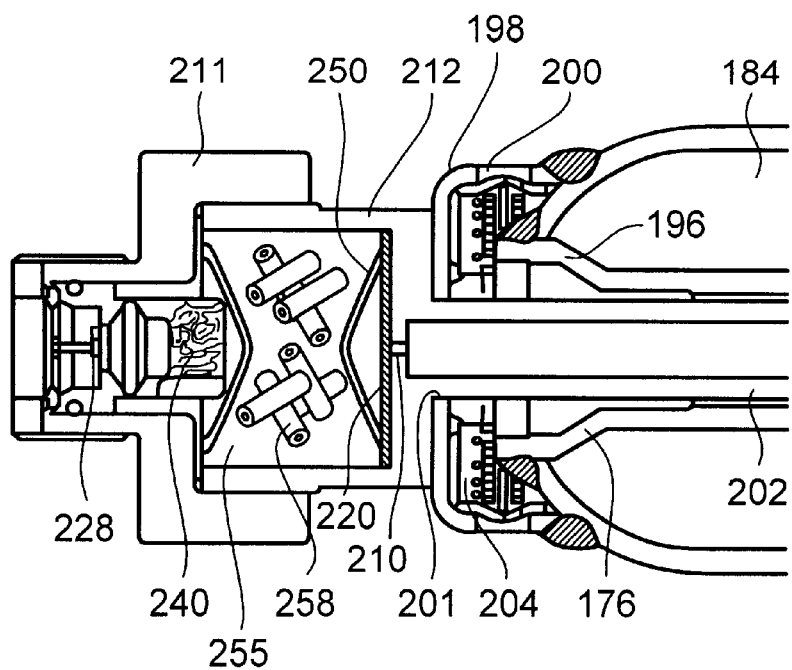
FIG. 5 is a vertical cross-sectional view of a main portion of a dual type gas-generator in accordance with still another embodiment of the present invention.

A second method is to block the passage 210 formed in the housing 212 of the pyro-type cartridge in the gas generator of FIG. 1 by a rupturable member 220 ruptured only by activation of the pyro-type cartridge (that is, combustion pressure of the propellant 258 in the pyro-type cartridge), as shown in FIG. 5. Namely, the rupturable member 220 is adjusted in its thickness, material, and the like so as not to be ruptured by activation of the hybrid-type inflator (the pressure of the combustion product produced from the hybrid-type inflator). The passage blocked by the rupturable member 220 constitutes the gas outlet of the pyro-type cartridge, and the gas outlet adjusts an internal pressure of the pyro-type cartridge when the pyro-type gas generating material is combusted. Such a dual type inflator device uses polyacrylonitril type gas generating agent having the same shape and composition as those of the propellant 158 of the hybrid-type inflator as the propellant accommodated in the housing 212 in FIG. 1. In detail, the shape of the propellant 258 is shaped to have a single through-hole with an outer diameter of 1.94 mm, a thickness of 0.67 mm and a length of 10 mm. When the propellant 258 is combusted in the housing 212, its combustion internal pressure reaches $2 \times 10^4$ to $10^6$ kPa. For this object, in this embodiment, the rupturable member 220 made of 0.03 mm stainless steel is used so as to be ruptured only by the combustion internal pressure of the propellant 258. It is to be noted that the combustion internal pressure is correlated with the open area of the passage 210 of the pyro-type cartridge so that the inner diameter of the opening 210 is set to 2.6 mm for using the stainless steel ruputurable member 220 of 0.03 mm. In this manner, it can be suggested that the light-emitting phenomenon is suppressed because the gas of the hybrid-type inflator is prevented from flowing into the pyro-type cartridge to warm the propellant 258.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. A dual type inflator device for inflating an air bag, comprising:

a hybrid-type inflator having a pressurized medium contained therein, a first activating assembly for activating the hybrid-type inflator, a diffuser assembly having an outlet hole, and an after-burner tube in communication with the diffuser assembly, such that a first gas is discharged into the air bag through the after-burner tube and the diffuser assembly; and a pyro-type inflator attached to the diffuser assembly, and having a pyro-type gas generating material, a second activating assembly for igniting the pyro-type gas generating material, a gas outlet, and a connecting tube, having an outer diameter smaller than an inner diameter of the after-burner tube, in communication with the gas outlet, such that a second gas is discharged into the air bag through the gas outlet, the connecting tube, and outlet hole of the diffuser assembly, wherein the connecting tube extends through the diffuser assembly and at least partially into the after-burner tube to discharge the second gas directly into after-burner tube.

2. A dual type inflator device according to claim 1, wherein the second gas generated by the pyro-type inflator is further combusted by the first gas inside the after-burner tube at a downstream side of the connecting tube.

3. A dual type inflator device according to claim 1, wherein the first gas contains at least 2 mol % of oxygen.

4. A dual type inflator device according to claim 1, wherein the first gas contains about 2 to 30 mol % of oxygen.

5. A dual type inflator device according to of claim 1, wherein the diffuser assembly contains a filter, and the first and second gasses are discharged from the outlet hole of the diffuser assembly after the first and second gasses pass through the filter.

6. A dual type inflator device according to claim 1, wherein the gas outlet is blocked by a rupturable member, and the rupturable member is ruptured only by an activation of the pyro-type inflator.

7. A dual type inflator device according to claim 1, wherein the gas outlet adjusts an internal pressure in the pyro-type inflator when the pyro-type gas generating material is being combusted.

8. A dual type inflator device according to claim 1, wherein the hybrid-type inflator includes, an inflator housing having a first space therein, a gas generator provided inside the first space, the gas generator having a second space in communication with the first space and containing a gas generating propellant therein, a first closing disk for sealing the after-burner tube, a projectile aligned with the first closing disk, and combustion product producing means, activated by the activating assembly, for producing combustion product for igniting the gas generating propellant and propelling the projectile to penetrate the first closing disk.

9. A dual type inflator device according to claim 5, wherein the filter includes a plurality of layers of metal net.

10. A dual type inflator device according to claim 1, wherein the pressurized medium includes oxygen and inert gas.

11. A dual type inflator device according to claim 1, wherein the first gas is an oxygen-rich gas.

12. A dual type inflator device according to claim 1, wherein the second gas is a fuel-rich gas.

13. A dual type inflator device for inflating an air bag, comprising:

a hybrid-type inflator having a pressurized medium contained therein, a first activating assembly for activating the hybrid-type inflator, a diffuser assembly having an outlet hole, and an after-burner tube in communication with the diffuser assembly, such that a first gas is discharged into the air bag through the after-burner tube and the diffuser assembly; and a pyro-type inflator attached to the diffuser assembly, and having a pyro-type gas generating material, a second activating assembly for igniting the pyro-type gas generating material, a gas outlet, and a connecting tube in communication with the gas outlet and extending into the after-burner tube, such that a second gas is discharged into the air bag through the gas outlet, the connecting tube, and outlet hole of the diffuser assembly, wherein the gas outlet is blocked by a rupturable member, and the rupturable member is ruptured only by an activation of the pyro-type inflator.

* * * * *